US010431940B1

(12) United States Patent
Walma, Jr.

(10) Patent No.: US 10,431,940 B1
(45) Date of Patent: Oct. 1, 2019

(54) POWER RECEPTACLE WITH WIRELESS CONTROL

(71) Applicant: Cooper Technologies Company, Houston, TX (US)

(72) Inventor: Kenneth Dale Walma, Jr., Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 119 days.

(21) Appl. No.: 15/629,628

(22) Filed: Jun. 21, 2017

Related U.S. Application Data

(60) Provisional application No. 62/353,488, filed on Jun. 22, 2016.

(51) Int. Cl.

| | |
|---|---|
| ***H05B 37/02*** | (2006.01) |
| ***H01R 13/70*** | (2006.01) |
| ***H02J 5/00*** | (2016.01) |
| ***H01H 47/00*** | (2006.01) |
| ***H01R 13/66*** | (2006.01) |
| ***H01R 24/64*** | (2011.01) |
| ***H04W 76/10*** | (2018.01) |
| *H01R 107/00* | (2006.01) |

(52) U.S. Cl.
CPC ............. *H01R 13/70* (2013.01); *H01H 47/00* (2013.01); *H01R 13/665* (2013.01); *H01R 13/6691* (2013.01); *H01R 24/64* (2013.01); *H02J 5/00* (2013.01); *H04W 76/10* (2018.02); *H01R 2107/00* (2013.01)

(58) Field of Classification Search
CPC .. H01R 13/70; H01R 13/665; H01R 13/6691; H01R 2107/00; H04W 76/10; H02J 5/00
USPC .......................................................... 307/104
See application file for complete search history.

(56) References Cited

U.S. PATENT DOCUMENTS

| | | | | |
|---|---|---|---|---|
| 7,657,763 | B2 * | 2/2010 | Nelson ................ | H02J 13/0013 323/234 |
| 7,843,081 | B2 * | 11/2010 | Lim .................. | H01R 13/6641 307/11 |
| 8,093,753 | B2 * | 1/2012 | Lee ........................ | G06F 1/266 307/125 |
| 8,374,729 | B2 * | 2/2013 | Chapel ................ | H02J 13/0082 700/295 |
| 9,588,534 | B2 * | 3/2017 | Chapel ................ | H04L 12/4633 |
| 9,918,371 | B2 * | 3/2018 | Jacobson ................ | F21V 23/04 |
| 10,050,441 | B2 * | 8/2018 | Chapel ...................... | H02J 3/14 |
| 2011/0014867 | A1 * | 1/2011 | Chen .................. | H04M 1/7253 455/41.2 |

* cited by examiner

*Primary Examiner* — Dinh T Le
(74) *Attorney, Agent, or Firm* — King & Spalding LLP

(57) ABSTRACT

A power receptacle includes a socket, where a direct current (DC) power signal is provided at the socket to provide a DC power to a device that gets plugged into the socket. The power receptacle further includes a switch that is electrically coupled to the socket. The power receptacle also includes a controller that controls the switch to control whether the DC power signal is available at the socket. The controller controls the switch based on a power control command that is wirelessly received by the power receptacle.

18 Claims, 5 Drawing Sheets

POWER RECEPTACLE WITH WIRELESS CONTROL

CROSS REFERENCE TO RELATED APPLICATIONS

The present application claims priority under 35 U.S.C. Section 119(e) to U.S. Provisional Patent Application No. 62/353,488, filed Jun. 22, 2016 and titled "Power Receptacle With Wireless Control," the entire content of which is incorporated herein by reference.

TECHNICAL FIELD

The present disclosure relates generally to Direct-Current (DC) electrical power receptacles and more particularly, to wireless control of DC power receptacles.

BACKGROUND

Power receptacles are commonly distributed through a building for providing power for pluggable devices. Increases in energy efficiency and proliferation of lower power microprocessor based devices have contributed to an increased number of DC power receptacle sockets distributed throughout a space and that may be used for running or charging devices such as mobile phones. DC power receptacle sockets may be integrated with line voltage (e.g., 120V) or other receptacles. Alternatively, DC power receptacle sockets may be available as standalone receptacles and provide DC power to run and/or charge pluggable devices. For example, USB and RJ-45 sockets, which may provide DC power for running and/charging devices, are widely available as standalone receptacles and are becoming more commonly available integrated with line power or other receptacles. While building management systems continue to improve electrical efficiency with sensors and controllers, DC power receptacles are largely uncontrolled and could be missing from an operating profile of a building. Thus, a solution that provides wireless control and/or monitoring of DC power receptacles may be desirable.

SUMMARY

The present disclosure relates generally to lighting solutions, and more particularly to managing the establishment of wireless communications in a wireless lighting system based on dynamic power control. In an example embodiment, a power receptacle includes a socket, where a Direct Current (DC) power signal is provided at the socket to provide a DC power to a device that gets plugged into the socket. The power receptacle further includes a switch that is electrically coupled to the socket. The power receptacle also includes a controller that controls the switch to control whether the DC power signal is available at the socket. The controller controls the switch based on a power control command that is wirelessly received by the power receptacle.

In another example embodiment, a system for controlling a Direct Current (DC) power provided at a power receptacle includes a DC power source and a power receptacle. The power receptacle includes a socket, where a DC power signal is provided at the socket to provide a DC power to a device that gets plugged into the socket. The DC power signal is provided by the DC power source. The power receptacle further includes a switch that is electrically coupled to the socket. The power receptacle also includes a controller that controls the switch to control whether the DC power signal is available at the socket. The controller controls the switch based on a power control command that is wirelessly received by the power receptacle.

These and other aspects, objects, features, and embodiments will be apparent from the following description and the claims.

BRIEF DESCRIPTION OF THE DRAWINGS

The foregoing and other features and aspects of the disclosure are best understood with reference to the following description of certain example embodiments, when read in conjunction with the accompanying drawings, wherein.

Figure 1:
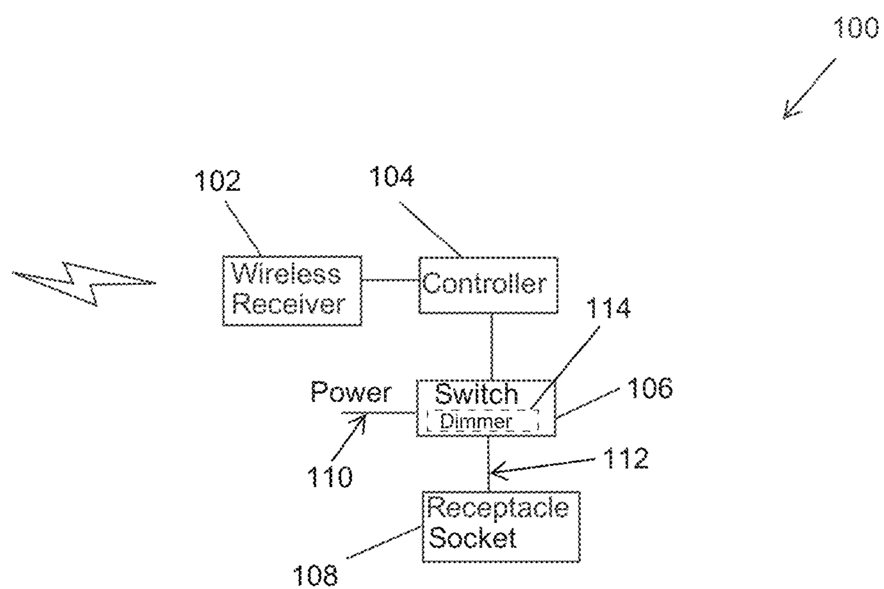
FIG. 1 illustrates a wirelessly controllable power receptacle according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the figures, the same reference numerals used in different figures designate like or corresponding, but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the drawings, FIG. 1 illustrates a wirelessly controllable power receptacle 100 according to an example embodiment. Referring to FIG. 1, the power receptacle 100 includes a wireless receiver 102, a controller 104, a switch 106, and a receptacle socket 108. The wireless receiver 102 is coupled to the controller 104 by one or more electrical connections (e.g., one or more electrical wires or traces). The controller 104 is coupled to the switch 106 by one or more electrical connections (e.g., one or more electrical wires or traces). The receptacle socket 108 is coupled to the switch 106 by one or more electrical connections (e.g., one or more electrical wires or traces).

In some example embodiments, a Direct Current (DC) power signal is provided at the socket 108 to provide a DC power to a device that gets plugged into the socket 108. For example, the socket 108 may be a Universal Serial Bus (USB) socket. As another example, the socket 108 may be an RJ-45 socket. The controller 104 may control the switch 106 to control whether the DC power signal is available at the socket 108. The controller 104 may control the switch 108 based on one or more power control commands that are wirelessly received by the power receptacle 100.

To illustrate, the wireless receiver 102 may wirelessly receive a power control command from a control device and may provide the power control command to the controller 104. For example, the wireless receiver 102 may wirelessly receive a control signal that carries the power control command and may provide the control signal to the controller 104. As another example, the wireless receiver 102 may wirelessly receive the control signal that carries the power control command and provide a second signal generated from the control signal to the controller 104, where the power control command is provided to the controller 104 by the second signal. The wireless receiver 102 may wirelessly receive the power control command from a control device such as a laptop, a mobile phone, a lighting system control device, a wall station, etc.

In some example embodiments, the wireless receiver 102 may be compliant with one or more wireless communication standards or a proprietary wireless communication protocol. For example, the wireless receiver 102 may be compliant with one or more Wi-Fi standards, a ZigBee standard, Bluetooth, etc.

In some example embodiments, the controller 104 controls the switch 106 to control the availability of the DC power signal (thus, DC power) at the socket 108 and/or to control the characteristic of the DC power signal available at the socket 108. For example, the controller 104 may control whether the switch 106 is opened or closed. The controller 104 may close (i.e., turn on) the switch 106 to make the DC power signal available at the socket 108 and may open (i.e., turn off) the switch 106 to make the DC power signal unavailable at the socket 108. By controlling the switch 106, the controller 104 may control whether the DC power signal is available at the receptacle socket 108.

In some example embodiments, the DC power signal may be received by the switch 106 via a connection 110 (e.g., on or more electrical wires) and may be made available at the receptacle socket 108, through the switch 106, via a connection 112 (e.g., one or more electrical wires). The DC power signal may be provided to the switch 106 via the connection 110 from a DC power source, such as a battery, an AC/DC converter, or another source as may be contemplated by those of ordinary skill in the art with the benefit of this disclosure.

In some example embodiments, the controller 104 may turn on and off the switch 108 based on the power control command that is wirelessly received by the power receptacle 100. As described above, the controller 104 may wirelessly receive a control signal that carries the power control command. For example, the wirelessly received control signal may indicate whether the DC power signal at the receptacle socket 108 should be turned on or off.

In some example embodiments, the switch 108 may include a dimmer 114, and the controller 104 may control the power level (e.g., the voltage level) of the DC power signal at the socket 108 based on a power control command. For example, the control signal that is wirelessly received by the wireless receiver 102 may carry a power control command that directly or indirectly indicates the power level that the DC power signal at the receptacle socket 108 should have. The dimmer 114 may be implemented in one of several ways as may be contemplated by those of ordinary skill in the art with the benefit of this disclosure.

In some example embodiments, the controller 104 may process the control signal that is wirelessly received by the wireless receiver 102 to determine whether to turn on or off and/or adjust the power level (e.g., voltage level) of the DC power signal at the receptacle socket 108. Alternatively, the wireless receiver 102 may process the wirelessly received control signal and indicate to the controller 104 whether the DC power signal at the receptacle socket 108 should be turned on or off and/or the power level adjusted.

In some example embodiments, the controller 104 may turn on or off as well as adjust the DC power signal at the receptacle socket 108 by controlling the switch 106. For example, the switch 106 may include a transistor (e.g., a power transistor) for turning off and on the DC power signal and to change the power level of the DC power signal at the receptacle socket 108. Alternatively, the switch 106 may include a transistor for turning on and off the DC power signal at the socket 108, and a separate dimmer circuit for adjusting the power level of the DC power signal available at the receptacle socket 108.

By integrating wireless communication and power control capabilities into receptacles that provide DC power, the power receptacle 100 enables improved power management, such as power management of a building. The power receptacle 100 provides improved overall control over power usage.

In some example embodiments, some of the components of the power receptacle 100 may be integrated into a single component without departing from the scope of this disclosure. For example, the wireless receiver 102 may be integrated into the controller 104. In some example embodiments, the dimmer 114, when present, may be external to the switch 106 without departing from the scope of this disclosure.

Figure 2:
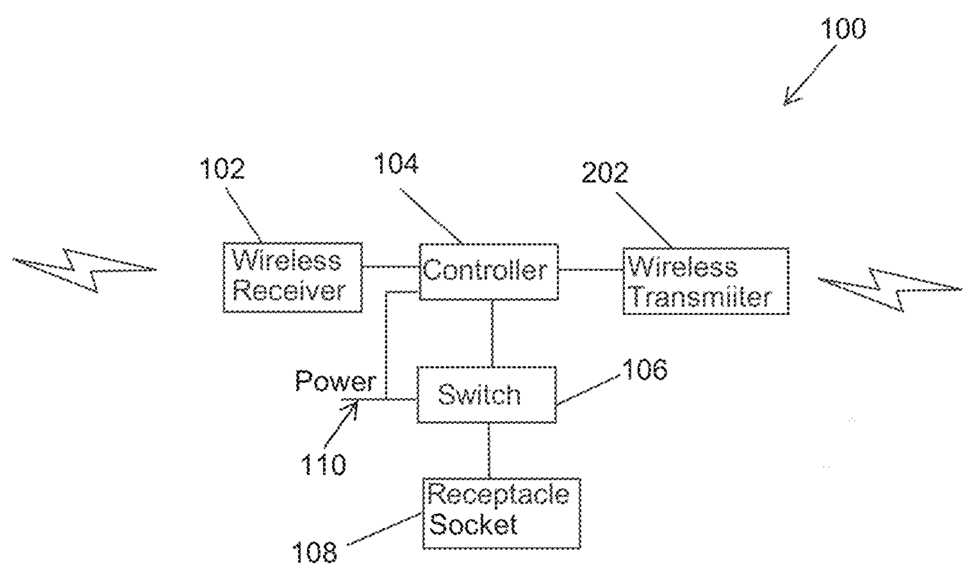
FIG. 2 illustrates the wirelessly controllable power receptacle of FIG. 1 according to another example embodiment.

FIG. 2 illustrates the wirelessly controllable power receptacle 100 of FIG. 1 according to another example embodiment. Referring to FIGS. 1 and 2, in some example embodiments, the power receptacle 100 may include a wireless transmitter 202 that is communicably coupled to the controller 104. For example, the wireless transmitter 202 may transmit a monitor signal to a remote control device (e.g., a laptop, a mobile phone, lighting system control device, etc.).

In some example embodiments, the controller 104 may provide the monitor signal to the wireless transmitter 202. For example, the controller 104 may monitor the input power signal received via the connection 110 and send information about the input power signal to the transmitter 202 that transmits a monitor signal carrying the information from the controller 104. The monitor signal may indicate the voltage level of the input power signal provided to the switch 106, the amount of current flowing through the switch 106, etc.

In some alternative example embodiments, the controller 104 may monitor the DC power signal at the connection 112 instead of or in addition to the input power signal at the connection 110. The controller 104 may provide information related to the signal at the monitored node to the transmitter 202 for wireless transmission, for example, to a remote control device, such as a central control device.

In some example embodiments, the controller 104 may include circuitry (e.g., a DC/DC converter and/or analog/digital converter) to convert the power signal at the connection 110, the power signal at the connection 112, or at another suitable/equivalent node to a voltage level and/or data format suitable for processing by the controller 104. The controller 104 may also include a microcontroller and a memory device that stores code executable by the microcontroller to perform operations. The information conveyed by the monitor signal transmitted by the wireless transmitter

202 may be used for tasks such as billing/charging for power usage and controlling overall power consumption, for example, by turning off or on power receptacles.

In some example embodiments, the transmitter 202 may be compliant with one or more wireless communication standards or a proprietary wireless communication protocol. For example, the wireless receiver 102 may be compliant with one or more Wi-Fi standards, a ZigBee standard, Bluetooth, etc.

By integrating wireless communication and power control capabilities into receptacles that provide DC power, the power receptacle 100 enables improved central power management including the capability to charge for DC power usage at individual power receptacles.

In some example embodiments, some of the components of the power receptacle 100 may be integrated into a single component without departing from the scope of this disclosure. For example, the wireless receiver 102 and the wireless transmitter 202 may be integrated into a wireless transceiver without departing from the scope of this disclosure.

Figure 3:
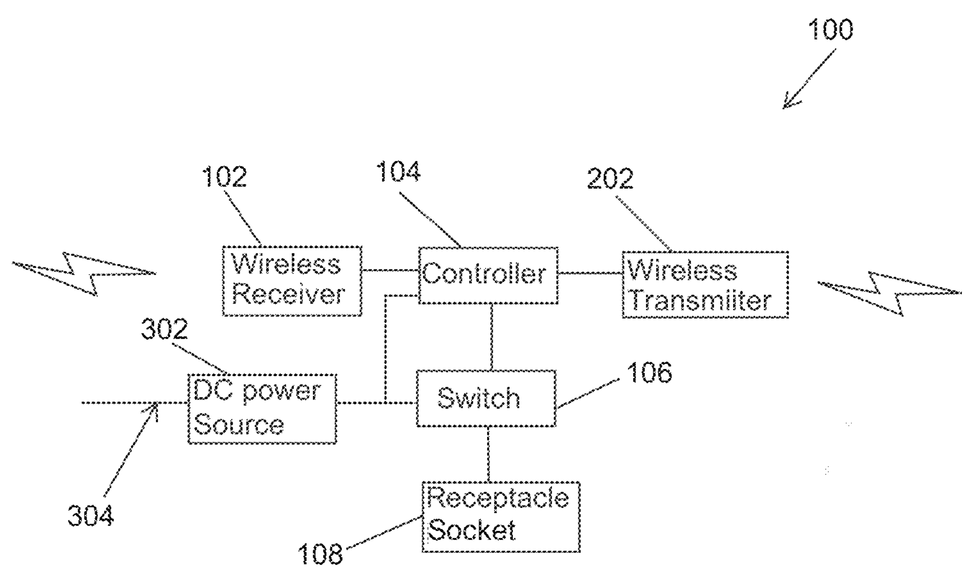
FIG. 3 illustrates the wirelessly controllable power receptacle of FIG. 2 according to another example embodiment.

FIG. 3 illustrates the wirelessly controllable power receptacle 100 of FIG. 2 according to another example embodiment. Referring to FIGS. 1-3, in some example embodiments, the power receptacle 100 may include a DC power source 302 that can provide a DC power signal to the receptacle socket 108 through the switch 106. For example, the DC power source 302 may be or may include an AC/DC converter for generating a DC power signal from an AC power signal provided to the DC power source 302 via a connection 304 (e.g., one or more electrical wires). An AC power signal (e.g., 120 VAC signal) may be provided to the DC power source 302 by an AC power source, such as a mains supply. The controller 104 may control the switch 106 as described above to control the availability of the DC power signal from the DC power source 302 at the socket 108. The controller 104 may also control the dimmer 114 as described above to adjust the DC power signal from the DC power source 302 that is available at the socket 108.

In some example embodiments, the DC power source 302 may be or may include a DC/DC converter for generating a DC power signal that is provided to the socket 108 through the switch 106. For example, the DC power source 302 may generate a voltage level that is appropriate for a particular type of the power receptacle 100. The DC power source 302 may generate a DC power signal from an input DC power signal provided to the DC power source 302 via the connection 304. Alternatively, the DC power source 302 may generate a DC power signal from a DC power signal generated by an AC/DC converter of the DC power source 302 from an input AC power signal provided via the connection 304.

Alternatively or in addition, the DC power source 302 may be or may include a battery and charger circuitry to charge the battery as can be understood by those of ordinary skill in the art with the benefit of this disclosure.

In some example embodiments, the controller 104 may monitor the DC power signal at the output of the DC power source 302 and provide information related to the monitored DC power signal to the transmitter 202 for wireless transmission, for example, to a central power management device. In some alternative embodiments, the wireless transmitter 202 may be omitted without departing from the scope of this disclosure. In some example embodiments, the power receptacle 100 may be considered as a system for controlling DC power at the socket 108 of the power receptacle 100. In some alternative embodiments, the DC power source 302 may be external to the power receptacle 100 such that the DC power source 302 and the power receptacle 100 are form a system for controlling DC power at the socket 108 of the power receptacle 100.

Figure 4:
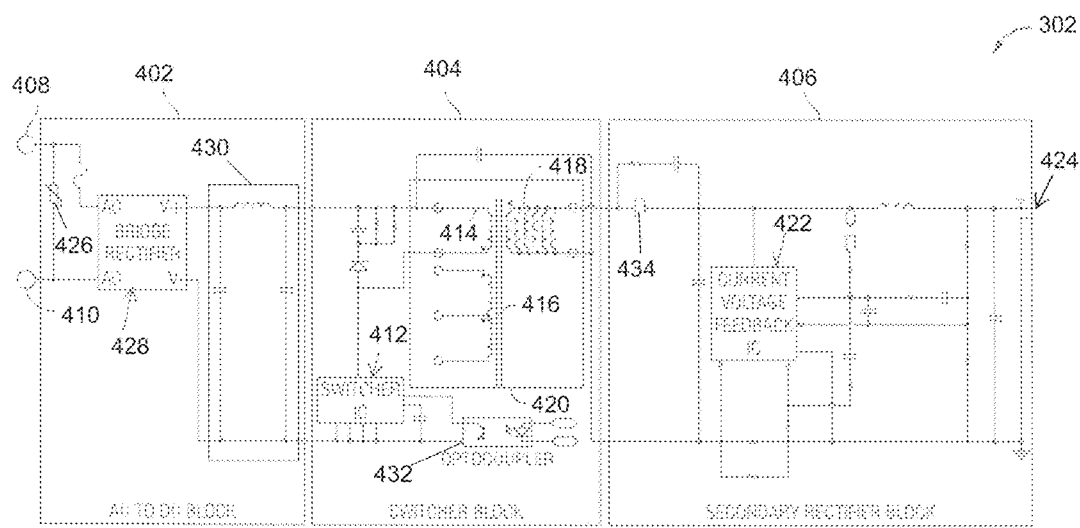
FIG. 4 illustrates a schematic diagram of the power source of FIG. 3 according to an example embodiment.

FIG. 4 illustrates a schematic diagram of the power source 302 of FIG. 3 according to an example embodiment. Referring to FIG. 4, in some example embodiments, the DC power source 302 includes an AC/DC converter 402, switcher circuitry 404, and secondary rectifier circuitry 406. The AC/DC converter 402 may include a surge suppressor 426, a bridge rectifier 428, and a DC filter 430. As illustrated, the surge suppressor 426 is coupled between the hot and neutral wires 408, 410 that are coupled to an AC power source such as a mains supply. The surge suppressor 426 protects the DC power source 302 from voltage surges. The bridge rectifier 428 converts the AC power received via the hot terminal 408 and the neutral terminal 410 into high DC voltage of, for example, approximately 170 V. The DC filter 430 receives the DC voltage from the bridge rectifier 428 and smoothes the DC voltage into a smoother high DC voltage. The DC filter 430 of the AC/DC conversion block 402 is coupled to the switcher circuitry 404.

The switcher circuitry 404 converts the smoother high DC voltage from the AC/DC converter 403 into an isolated low voltage DC output that is provided to the secondary rectifier circuitry 406. In some example embodiments, the switcher circuitry 404 converts the high DC voltage into approximately 5 volts DC (e.g., for use with a standalone USB receptacle, a line power receptacle-integrated USB socket). Alternatively, the switcher circuitry 404 may convert the high DC voltage into a relatively low isolated DC voltage ranging from 5 volts to 25 volts. In yet other embodiments, the switcher block 404 may convert the high DC voltage into a relatively low isolated DC voltage that is less than from 5 volts or higher than 25 volts. In some example embodiments, the switcher block 404 may convert the high DC voltage to a voltage level compatible with Power-over-Ethernet provided via an RJ-45 socket.

In some example embodiments, the switcher circuitry 404 includes a switcher integrated circuit (IC) 412, a transformer 420, and a current voltage feedback optocoupler 432. The switcher IC 412 may function as a power supply controller. In certain example embodiments, the switcher IC 412 includes a field effect transistor ("FET"). The transformer 420 steps down the received DC voltage into the relatively low voltage DC output (e.g., 5 to 25 volts). As illustrated in FIG. 4, the transformer 420 includes a primary side 414 and a secondary side 418 for stepping down the DC voltage. The transformer 420 may also include one or more shielding windings 416 to reduce or suppress electromagnetic interference.

In some example embodiments, the secondary rectifier circuitry 406 includes a rectifier diode 434 and a current voltage feedback IC 422. The rectifier diode 434 along with other components of the secondary rectifier circuitry 406 operate to further rectify, smooth, filter, or otherwise condition the low DC voltage output from the switcher circuitry 404. The conditioned low voltage DC output is provided to the DC connector 424 that is coupled to the switch 106 as shown in FIG. 3. In some alternative embodiments, the DC power source 302 may be implemented using other components in addition to or instead of the components shown in FIG. 3 without departing from the scope of this disclosure.

Figure 5B:
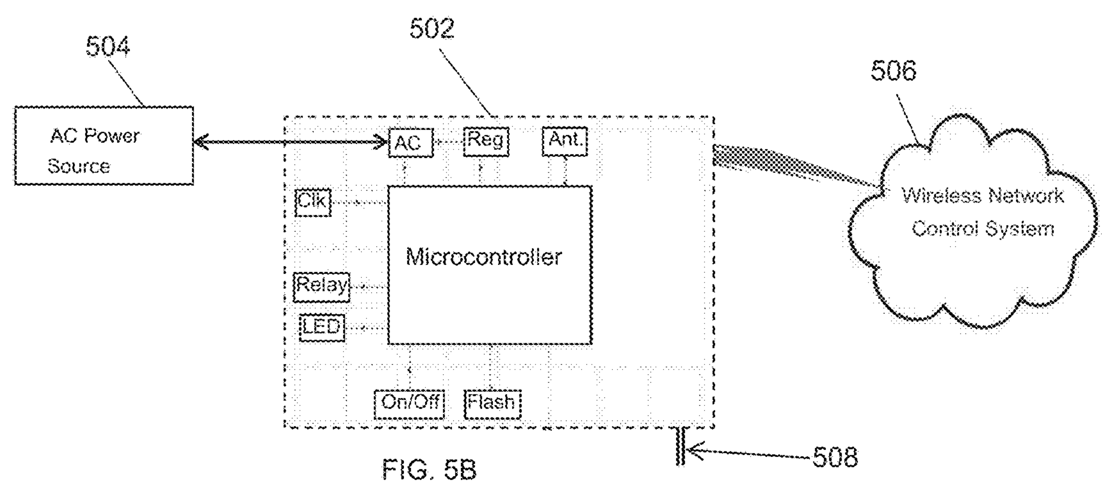
FIG. 5B illustrates the controller of the power receptacle of FIG. 5A according to an example embodiment.
Figure 5A:
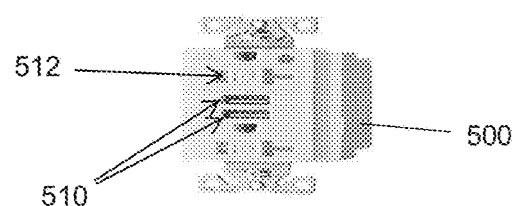
FIG. 5A illustrates a system including a power receptacle with integrated wirelessly controllable USB sockets according to an example embodiment.

FIG. 5A illustrates a system including a power receptacle 500 with integrated wirelessly controllable USB sockets according to an example embodiment. FIG. 5B illustrates a controller 502 of the power receptacle 500 according to an example embodiment. Referring to FIGS. 5A and 5B, the power receptacle 500 includes USB sockets 510 and line power sockets 512. In some example embodiments, the power receptacle 500 may include the controller 502 that receives AC power from an AC power source 504 such as a mains supply. The controller 502 may generate DC power for operation of some components of the controller 502 as well as to provide DC power at the USB sockets 510 via a connection 508 (e.g., one or more electrical wires). The controller 502 may also include radiofrequency components to wirelessly communicate with a remote control device over a wireless network control system 506. For example, the control device may control the DC power at the USB sockets 510 by transmitting one or more power control commands to the power receptacle 500 over the wireless network control system 506.

In some example embodiments, the controller 502 operates in a similar manner as described with respect to the controller 104 of FIGS. 1-3. To illustrate, the controller 502 may turn on and off DC power at one or both USB sockets 510 of the power receptacle 500 based on one or more power control commands that are wirelessly received by the power receptacle 500. For example, the controller 502 may turn on and off DC power at one or both USB sockets 510 based on a control signal wirelessly received by the controller 502 over the wireless network control system 506. As another example, the controller 502 may change the voltage level available at one or both USB sockets 510 based on a wirelessly received control signal carrying power control commands.

Although example embodiments have been described, it is to be construed that any features and modifications that are applicable to one embodiment are also applicable to the other embodiments. Furthermore, although the disclosure has been described with reference to specific embodiments, these descriptions are not meant to be construed in a limiting sense. Various modifications of the disclosed embodiments, as well as alternative embodiments of the disclosure will become apparent to persons of ordinary skill in the art upon reference to the description of the example embodiments. It should be appreciated by those of ordinary skill in the art that the conception and the specific embodiments disclosed may be readily utilized as a basis for modifying or designing other structures or methods for carrying out the same purposes of the disclosure. It should also be realized by those of ordinary skill in the art that such equivalent constructions do not depart from the spirit and scope of the disclosure as set forth in the appended claims. It is therefore, contemplated that the claims will cover any such modifications or embodiments that fall within the scope of the disclosure.

What is claimed is:

1. A power receptacle, comprising:

- a socket, wherein a direct current (DC) power signal is provided at the socket to provide a DC power to a device that is plugged into the socket;
- a switch that is electrically coupled to the socket;
- a controller that controls the switch to control whether the DC power signal is available at the socket, wherein the controller controls the switch based on a power control command that is wirelessly received by the power receptacle;
- a receiver that is communicably coupled to the controller, wherein the receiver receives the power control command and provides the power control command to the controller; and
- a transmitter communicably coupled to the controller, wherein the controller monitors the DC power signal and provides monitored information related to the DC power signal to the transmitter, and wherein the transmitter wirelessly transmits a monitor signal that includes the monitored information.

2. The power receptacle of claim 1, wherein the controller monitors an input power signal and provides second monitored information related to the input power signal to the transmitter, wherein the DC power signal is generated from the input power signal, and wherein the monitor signal includes the second monitored information.

3. The power receptacle of claim 1, wherein the controller turns on and off the switch based on the power control command to control whether the DC power signal is available at the socket.

4. The power receptacle of claim 1, wherein the switch comprises a dimmer and wherein the controller controls the dimmer based on the power control command to adjust a power level of the DC power signal provided at the socket.

5. The power receptacle of claim 1, wherein the DC power signal is provided by a DC power source.

6. The power receptacle of claim 1, further comprising a DC/DC converter to generate the DC power signal from an input DC signal.

7. The power receptacle of claim 1, further comprising an AC/DC converter to generate the DC power signal from an AC power signal received by the power receptacle.

8. The power receptacle of claim 6, wherein the power receptacle comprises a second socket to provide an AC power.

9. The power receptacle of claim 1, wherein the socket is a Universal Serial Bus (USB) socket.

10. The power receptacle of claim 1, wherein the socket is an RJ-45 socket.

11. A system for controlling a direct current (DC) power provided at a power receptacle, the system comprising:

- a DC power source; and
- a power receptacle, comprising:
  - a socket, wherein a DC power signal is provided at the socket to provide the DC power and wherein the DC power signal is provided by the DC power source;
  - a switch that is electrically coupled to the socket;
  - a controller that controls the switch to control whether the DC power signal is available at the socket, wherein the controller controls the switch based on a power control command that is wirelessly received by the power receptacle;
  - a receiver that is communicably coupled to the controller, wherein the receiver receives the power control command and provides the power control command to the controller; and
  - a transmitter communicably coupled to the controller, wherein the controller monitors the DC power signal and provides monitored information related to the DC power signal to the transmitter, and wherein the transmitter wirelessly transmits a monitor signal that includes the monitored information.

12. The system of claim 11, wherein the controller monitors an input power signal and provides second monitored information related to the input power signal to the transmitter, wherein the DC power signal is generated from the input power signal, and wherein the monitor signal includes the second monitored information.

13. The system of claim 11, wherein the switch comprises a dimmer and wherein the controller controls the dimmer based on the power control command to adjust a power level of the DC power signal provided at the socket.

14. The system of claim 11, wherein the DC power source is a battery.

15. The system of claim 11, wherein the DC power source is an AC/DC converter.

16. The system of claim 11, wherein the power receptacle comprises a second socket to provide an AC power.

17. The system of claim 11, wherein the socket is a Universal Serial Bus (USB) socket.

18. The system of claim 11, wherein the socket is an RJ-45 socket.

* * * * *